United States Patent [19]

Nagano

[11] Patent Number: 4,493,408

[45] Date of Patent: Jan. 15, 1985

[54] DAMPER DISC

[75] Inventor: Tamio Nagano, Hirakata, Japan

[73] Assignee: Kabushiki Kaisha Daikin Seisakusho, Osaka, Japan

[21] Appl. No.: 304,260

[22] Filed: Sep. 21, 1981

[51] Int. Cl.³ .............................................. F16D 3/14
[52] U.S. Cl. .................................................. 192/106.2
[58] Field of Search ............... 192/106.2, 106.1, 70.16, 192/70.17, 70.18; 464/64, 68

[56] References Cited

U.S. PATENT DOCUMENTS

| | | | |
|---|---|---|---|
| 3,817,362 | 6/1974 | Rist | 192/106.2 |
| 3,931,876 | 1/1976 | Beeskow et al. | 192/106.2 |

FOREIGN PATENT DOCUMENTS

| | | | |
|---|---|---|---|
| 2406348 | 8/1974 | Fed. Rep. of Germany | 192/106.2 |
| 1428557 | 3/1976 | United Kingdom | 192/106.2 |

*Primary Examiner*—George H. Krizmanich
*Assistant Examiner*—M. Manley
*Attorney, Agent, or Firm*—Armstrong, Nikaido, Marmelstein & Kubovcik

[57] ABSTRACT

A damper disc applicable to a clutch disc comprising a hub flange; a pair of annular side plates; a pair of annular sub-plates disposed between the side plates and the flange; stud pins connecting the subplates together; recesses formed at middle portions of the side edges of the openings in the flange, each stud pin passing through each recess with a space corresponding to a torsion angle for first hysteresis torque between the stud pin and the side edge of the recess; stop pins connecting the radially outer portions of the side plates together; notches formed at outer edges of the openings in the flange, each stop pin passing through each notch with a space corresponding to a maximum torsion angle between the stop pin and the side edge of the notch; and thereby, a maximum torsion angle can be set large, and the sub-plates can operate stably.

3 Claims, 7 Drawing Figures

DAMPER DISC

BACKGROUND AND SUMMARY OF THE PRESENT INVENTION

This invention relates to a damper disk applicable to friction clutch discs of land vehicles.

In a type of known damper discs, a sub-plate is arranged between a radial flange of a hub splined to an output shaft and each of side plates which are a clutch plate and a retaining plate. A first friction member having small frictional force is arranged between the hub-flange and each sub-plate, and a second friction member having large frictional force is arranged between each side plate and each sub-plate. In this construction, when small torque is transmitted, and therefore relative torsion angle between the hub-flange and the side plates is small, slide occurs on the surface of each first friction member, so that small hysteresis torque occurs. When the transmitted torque increases to large value, and thereby the torsion angle increases to large value, slide occurs on the surface of each second friction member, so that large hysteresis torque occurs. In the disc in which the hysteresis torque changes as stated above, noises can be prevented during both idling and high power driving.

However in this known type of the damper disc, since the hub flange has large recesses through which stud pins connecting the sub-plates together and stop pins supported by the side plates pass, the strength of the hub flange is reduced by said large recesses. Therefore it is impossible to form large and long openings in the flange in which long torsion springs for efficiently absorbing torque vibration can be fitted, which results in disadvantage that desired effect for absorbing the torque vibration can not be obtained.

Accordingly, it is an object of the invention to provide a damper disc, wherein positions, shapes and sizes of notches and recesses for stop pins, stud pins are improved.

Other and further objects, features and advantages of the invention will appear more fully from the following description of the preferred embodiment of the invention.

DETAILED DESCRIPTION OF THE PREFERRED EMBODIMENTS

Figure 1:
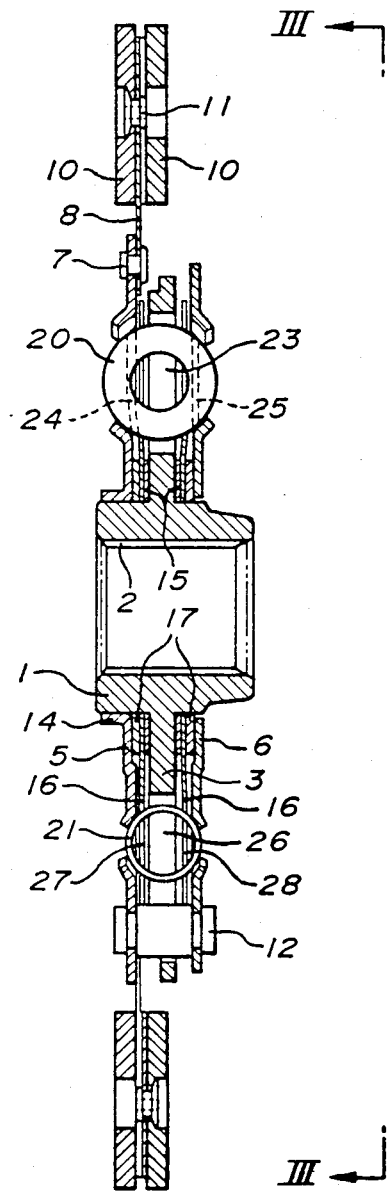
FIG. 1 is a sectional view of a preferred embodiment of the clutch disc of the invention.

Referring to FIG. 1, a hub 1 comprises inner teeth 2 splineable to an output shaft (not shown) and a radial flange 3 on its outer periphery. A pair of annular side plates 5 and 6 are arrange at both sides of the flange 3. Cushioning plates 8 are fixed at the radially outer portion of the side plate 5, which is a clutch plate, by rivets 7. A pair of annular friction facings 10 are fixed at both faces of the plates 8 by rivets 11, respectively. The outer portions of the side plates 5 and 6 are connected to each other by stop pins 12. The plate 5 has a bent cylindrical flange 14 projecting away from the flange 3 and rotatably fitting onto the outer periphery of the hub 1 to which induction hardening is applied. The plate 6, which is a retaining plate, does not have a cylindrical flange. The inner edge of the plate 6 is positioned around the outer periphery of the hub 1 with a slight space therebetween.

An annular sub-plate 16 is arranged between the flange 3 and each of the side plates 5 and 6. A first friction member 15 is arranged between the radially inner portion of the flange 3 and each sub-plate 16. A second friction member 17 is arranged between each of the side plate 5 and 6 and the adjacent sub-plate 16. These friction members 15 and 17 are friction washers, wave springs or the like.

Figure 2:
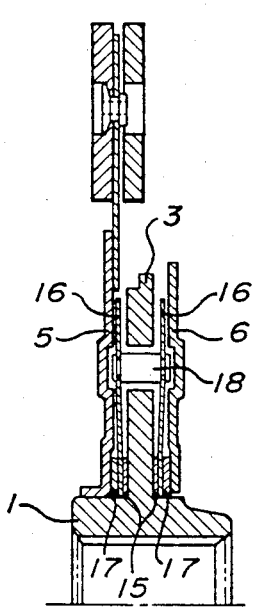
FIG. 2 is a sectional partial view illustrating other part of the clutch disc in FIG. 1.

Referring to FIG. 2, radially middle portions of both sub-plates 16 are tightly connected together by a stud pin 18. The pin 18 pushes the sub-plates 16 strongly against second friction members 17, so that each second friction member 17 has a large frictional force. Said pushing force by the pin 18 reduces the pressure applied to each first friction member 15, so that frictional force of each member 15 is small. The surfaces of each first friction member 15 may be formed smooth, and the surfaces of each second member 17 may be formed rough, for setting the difference of the frictional forces as stated above.

Referring to FIG. 1, a torsion spring 20, which is a compressible coil spring, is thick and has a large diameter. A torsion spring 21, which is also a compressible coil spring, is thin and has a small diameter. The springs 20 and 21 extend in a substantially circumferential direction of the disc (in other words, vertically with respect to FIG. 1), and are arranged in openings 24, 25 and 23 formed in the side plates 5 and 6 and the flange 3 and registering in axial direction of the disc (in other words, transversely with respect to FIG. 1). The sub-plates 16 have recesses for the springs 20 and 21.

Figure 3:
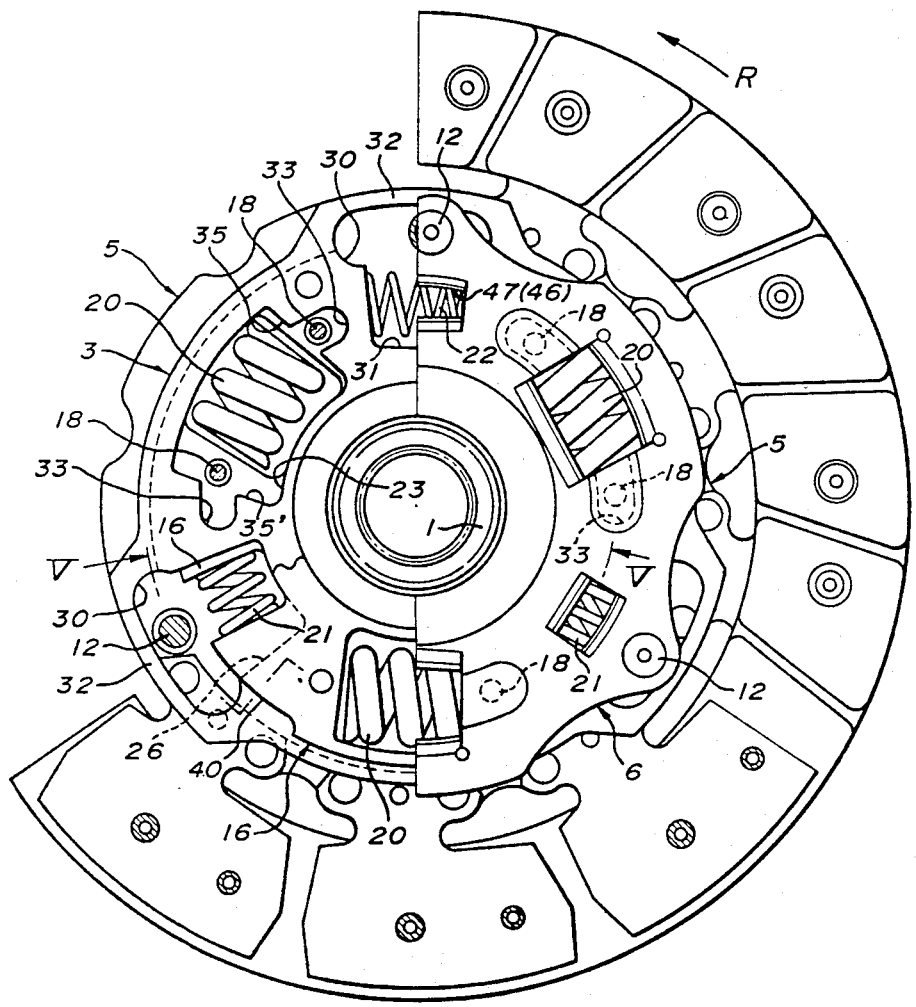
FIG. 3 is a partial view of the clutch disc viewed in the direction of arrows III—III in FIG. 1 with certain part cut out.
Figure 4:
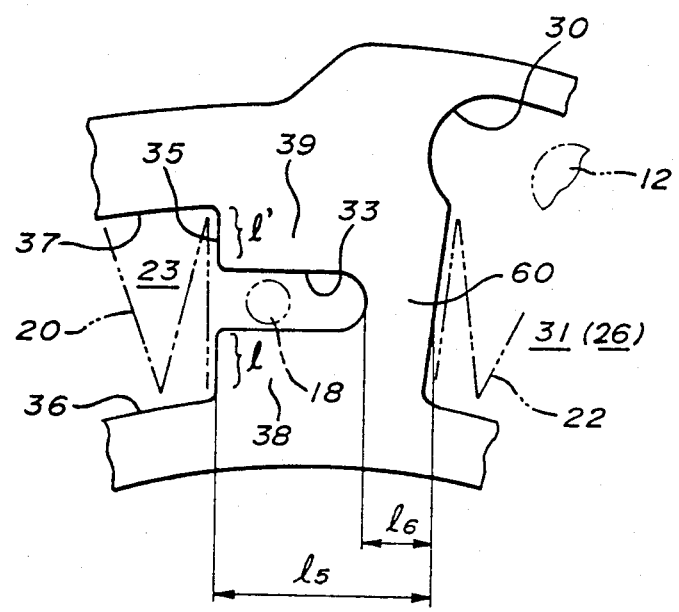
FIG. 4 is a schematic enlarged view illustrating a part of the FIG. 3.

Referring to FIG. 3, three large springs 20, two small springs 21 and one spring 22 which is thinner than the springs 21 are disposed in the disc. Each large spring 20 and each of the small springs 21 and 22 are arranged one after the other with a constant space therebetween. Three stop pins 12 are disposed respectively outside the small springs 22 and 21, and extend through notches 30 formed in the flange 3. Each notch 30 continues to the adjacent opening 26 for the spring 21 or the opening 31 for the spring 22. The notches 30 are surrounded by the outer edge 32 of the flange 3. Each sub-plate 16 has shallow recesses 40 in which the stop pins 12 can travel without any contact with the sub-plates 16. The stud pins 18 are arranged beside both ends of each large spring 20, thus the disc has six stud pins 18. Each stud pin 18 passes through the recess 33 formed in the flange 3. As shown in FIG. 4, the recesses 33 are formed at middle portions of side edges 35 and 35′ (FIG. 3) of the openings 23. In other words, portions 38 and 39 having radial length l and l′ between each recess 33 and the inner and outer edges 36 and 37 of each opening 23 are not recessed. Ends of each spring 20 is designed to be supported by the un-recessed portions 38 and 39 during a twisting operation detailed later.

Figure 5:
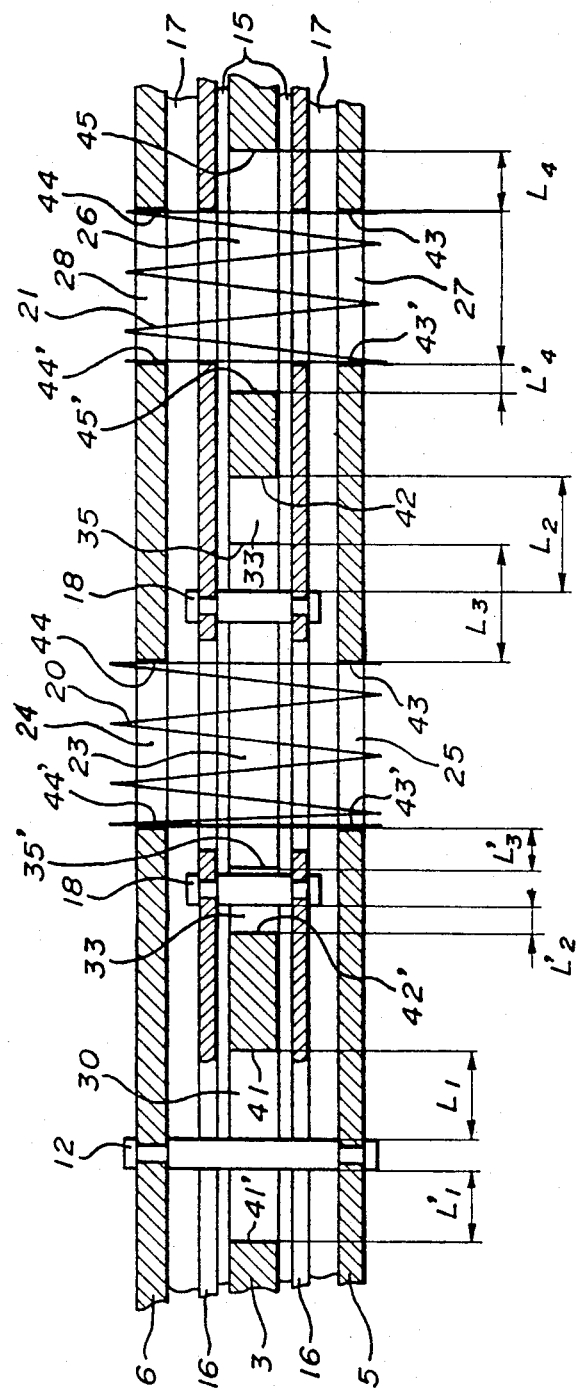
FIG. 5 is a sectional view taken along line V—V in FIG. 3.

Referring to FIG. 5, circumferential spaces $L_1$ and $L'_1$ are formed between each stop pin 12 and both side edges 41 and 41' of each notch 30 of the flange 3. The space $L_1$ and $L'_1$ and other spaces detailed hereinafter are formed when the plates 5,6 and 16 do not twist or torsionally turn with respect to the flange 3 as illustrated, and torsion angle D (see FIG. 6) is 0°. The space $L_1$ corresponds to maximum torsion angle, e.g., 16° in FIG. 6, in the positive torsion direction. The space $L'_1$ corresponds to maximum torsion angle, e.g., 8°, in negative torsion direction. Spaces $L_2$ and $L'_2$ are formed between each stud pin 18 and adjacent side edges 42 and 42' of the recesses 33 in the flange 3. The spaces $L_2$ and $L'_2$ correspond to positive torsion angle 12° and negative torsion angle 4°, respectively, at which second hysteresis torque H starts to occur. When the torsion angle D is 0°, both ends of the springs 20 and 21 are supported by side edges 43 and 43' 44 and 44' of the openings in the side plates 5 and 6. Spaces $L_3$ and $L'_3$ are formed between both ends of the springs 20 and the side edges 35 and 35' of the openings in the flange 3. The spaces $L_3$ and $L'_3$ correspond to positive and negative third torsion angle 13° and 5°. Spaces $L_4$ and $L'_4$ are formed between both ends of the springs 21 and side edges 45 and 45' of the openings in the flange 3. The spaces $L_4$ and $L'_4$ correspond to second torsion angle 11° and 3°. As shown in FIG. 3, both ends of the spring 22 are supported by the side edges of the openings 31, 46 and 47 in the flange 3 and the side plates 5 and 6. Side edges of the openings in the sub-plates 16 are in contact with the ends of the springs 21 and 22, and are apart from the ends of the spring 20 with spaces therebetween, which correspond to a torsion angle of 1° (13°-12°, 5°-4°) or more. Said value 1° is difference of the torsion angle between the start of third torsion operation by the springs 20 and the start of the second hysteresis torque H.

Figure 6:
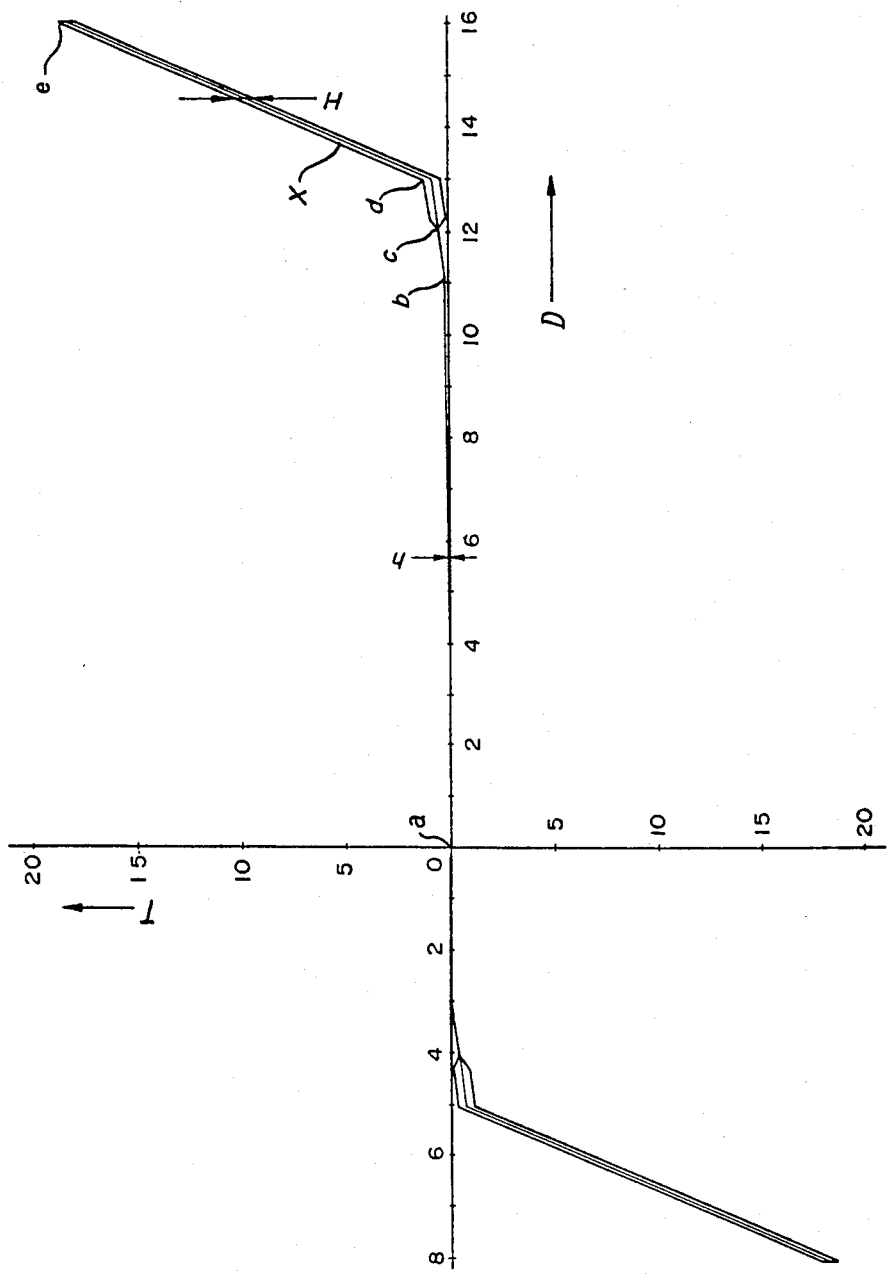
FIG. 6 is a graph explaining the relation between torque and torsion of the clutch disc of the invention.

The operation is as follows. In the situation, as illustrated in FIGS. 1 to 5, where the torsion angle D is 0°, when the facings 10 are pressed to a flywheel (not shown) of an engine by a pressure plate (not shown), torque is transmitted to the side plates 5 and 6, and the disc rotates in a direction R in FIG. 3. While the torque is a low value, the side plates 5 and 6 are connected to the sub-plates 16 by means of the second friction member 17 without any slide, and slide occurs on the surfaces of the members 15, thereby the side plates 5 and 6 twist with respect to the flange 3 in the rotating direction R of the disc in FIG. 3. By this twist, the small spring 22 is pressed by the left side edge in FIG. 4 of the opening 31 in the flange 3 and the right edges, in FIG. 3, of the openings 46 and 47 in the side plates 5 and 6. Thus, the torque is transmitted from the side plates 5 and 6 to the output shaft through the spring 22, the flange 3 and the hub 1. Although, the springs 20 and 21 travel together with the side plates 5 and 6, they do not contact with the side edges of the openings 23 and 26 in the flange 3. Therefore the torque is not transmitted through the springs 20 and 21. Since only one weak spring 22 operates as a spring for transmitting the torque in this operation, the rate of increase of the torque T with respect to the torsion angle D of the plates 5 and 6 is low as shown in section a-b of torque-angle characteristic line X in FIG. 6. Further, a small first hysteresis torque h caused by said slide of the members 15 occurs in this operation as illustrated in FIG. 6. This operation continues until the torsion angle D reaches 11°.

When the torsion angle D exceeds 11°, the springs 21 having travelled the spaces $L_4$ in FIG. 5 contact with the side edges 45 of the openings in the flange 3, and start to be compressed. By this compression, some of the torque is transmitted from the side plates 5 and 6 to the flange 3 through the springs 21. Since the torque is transmitted through three springs 21 and 22 in this operation, the incline of the line X increases in section b-d.

When the torsion angle D exceeds 12°, the stud pins 18 having travelled the spaces $L_2$ in FIG. 5 contact with the side edges 42 of the recesses in the flange 3. After this contact (D>12°), the sub-plates 16 are connected to the flange 3 rigidly in the rotating direction, and the side plates 5 and 6 twist with respect to the sub-plates 16 and the flange 3. Thus, slide occurs on the surfaces of the second friction members 17 having large frictional force, and the large second hysteresis torque H is produced in the area of the angle over 12°.

When the torsion angle D exceeds 13°, the springs 20 having travelled the spaces $L_3$ in FIG. 5 contact with the side edges 35 of the openings in the flange 3, and the strong springs 20 start to be compressed. Thus, torque is transmitted from the side plates 5 and 6 to the flange 3 through the springs 20. Since all of the springs 20, 21 and 22 are compressed in this operation, the incline of the line X increases in section d-e.

When the torsion angle D reaches 16°, each stop pin 12 contacts with the side edge 41 of each notch 30, and further torsion is prevented.

When the torque T decreases to 0 kgm from the maximum value, the torsion angle D decreases to 0°. During this decreasing operation, the incline of the line X changes twice at 13° and 11°, and the hysteresis torque changes once at 12°. When the torque T increases in negative direction from 0 kgm, each member operates similarly as above, the angle D increases to 8° in negative area. In this operation, the incline of the line X changes twice at 3° and 5°, and the hysteresis torque changes once at 4°.

According to the invention, as detailed hereinbefore, as the hysteresis torque changes, the noise during idling and high power driving of the engine can effectively be prevented.

Further, the invention has advantages that the maximum torsion angle can be set large, and the subplates 16 can operate stably.

Figure 7:
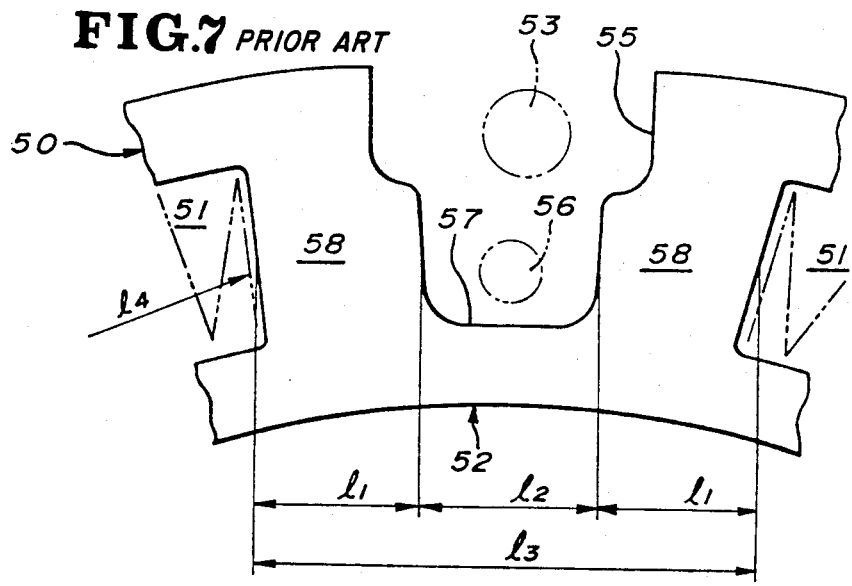
FIG. 7 is a schematic partial view of a known clutch disc corresponding to the FIG. 4.

Referring to FIG. 7, the known flange 50, which is not the invention, has a recess 55 through which a stop pin 53 extend. The recess 55 is formed at the portion outside and between two springs 51. Inner edge of the recess 55 is further recessed and formed into a recess 57 through which a stud pin 56 extends. The recesses 55 and 57 extend radially, from the outer edge of the flange 50 to the portion near the inner edge of the flange 50.

In this construction shown in FIG. 7, it is essential to form a spring seat portion 58 having long length $l_1$ between the spring 51 and the recess 57 so that the flange 50 may steadily support the springs 51, and the flange 50 may not be deformed by the elastic force of the springs 51. Therefore, adjacent two springs 51 are positioned apart from each other with a long space $l_3$ therebetween, which is a sum of the length $2l_1$ of two spring seat portions 58 and a length $l_2$ of the recess 57 ($l_3 = 2l_1 + l_2$). Thus, a length $l_4$ of the spring 51 and a opening should be set short, which results in disadvantage that a maximum torsion angle is small, and a torque vibration can not be effectively absorbed. Further, since the long space l₃ should be formed between the two springs 51 for forming the recess 57, only a few e.g., three, recesses 57 and stud pins 56 can be employed in the disc. Therefore only three portions of each sub-plate is engaged to the flange 30 by the three stud pins 56, and large partial pressure is applied to the sub-plates by the pins 56. Thus, the sub-plates may be deformed, and a intended hysteresis torque characteristic may not be obtained.

In comparison with this known art, according to the disc of the invention in FIG. 4, since the recess 33 is formed between the inner and outer spring seat portions 38 and 39, a space l₅ between two opening 23 and 31 (or 26) for the springs is the same as a length of the spring seat portion 39, and is short. In other words, a portion 60 between the recess 33 and the opening 31 is formed only for radially connecting the two spring seat portions 38 and 39 together, and the portion 60 does not support the spring. Therefore, a length l₆ of the portion 60 can be set short, and the space l₅ between two openings 23 and 31 (26) is short. Thus, each length of the openings 23, 31 and 26 and the springs 20, 22 and 21 can be set long, which increases the maximum torsion angle, and thereby, the torque vibration can be absorbed effectively. Further, as the stud pins 18 and the recesses 33 do not cause the increase of the space l₅ between the openings, many, e.g., six, stud pins 18 can be employed in the disc as shown in FIG. 3. Therefore, the pressure by the flange 3 is divided and applied to the many portions of the sub-plates 16 through the stud pins 18. Thus, the sub-plates 16 are prevented from deformation, and the intended torque hysteresis characteristic can be obtained.

Referring to FIG. 4, since each notch 30 for the stop pin 12 is positioned outside the opening 31, (26), the strength of the spring seat portions 38 and 39 is not reduced by the recesses 30. Also by this advantage, the space l₅ can be set short, and the maximum torsion angle can be set large. Further, the many stud pins 18 can be employed.

In modification of the invention, two pairs of the stud pins 18 may be arranged respectively beside both side edges of the two openings in the flange 3 which are opposite to each other with the center of the disc therebetween. Each stud pin 18 may be arranged beside only one side edge of each opening. Such spring mechanism may be employed that the incline of the line X changes once. In FIG. 3, portions 32 surrounding the openings 30 may be eliminated. A pair of coaxially arranged springs having large diameter and small diameter may be employed instead of one spring 20, 21 or 22.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed:

1. A damper disc comprising a hub splineable to an output shaft, said hub having an outer periphery;
   a radial flange formed on the outer periphery of the hub;
   a pair of annular side plates disposed at both sides of the flange;
   torsion springs disposed in alternating first and second openings formed in the flange and the side plates and registering in the axial direction of the disc, said side plates being connected to the flange by the springs, said first and second openings have side edges;
   a pair of annular sub-plates disposed between the side plates and the flange;
   stud pins connecting the sub-plates together;
   recess formed at middle portions of the side edges of the first openings in the flange, each stud pin passing through said each recess with a space between the stud pin and the side edge of the recess corresponding to a torsion angle for first hysteresis torque, at least one said stud pins being positioned in one of said first openings adjacent the respective recess in a forward circumferential direction of travel when the disc is not undergoing torsion;
   stop pins connecting the radially outer portions of the side plates together, said stop pins being positioned radially outwardly of said first and second openings;
   notches formed at radially outer edges of the second openings in the flange each having side edges, each stop pin passing through each notch with a space between the stop pin and the side edge of the notch corresponding to a maximum torsion angle;
   first friction members arranged between the sub-plates and the flange, and having small frictional force; and
   second friction members arranged between the sub-plates and the side plates, and having large frictional force.

2. The damper disc of claim 1, wherein some of the springs are distant from the side edges of the first openings in the flange with space corresponding to a torsion angle which is less than the maximum torsion angle, when the side-plate is not undergoing torsion.

3. The damper disc of claim 1, wherein three strong springs are employed, each being disposed in one of said first openings; six stud pins are arranged beside both ends of the three strong springs; and three weak springs are employed, each being disposed in one of said second openings.

* * * * *